J. W. TILTON.
CURTAIN FASTENER.
APPLICATION FILED NOV. 26, 1912.

1,082,455. Patented Dec. 23, 1913.

Witnesses

Inventor
John Walker Tilton
By J. R. Nottingham
Attorney

UNITED STATES PATENT OFFICE.

JOHN WALKER TILTON, OF ATLANTIC CITY, NEW JERSEY.

CURTAIN-FASTENER.

1,082,455.   Specification of Letters Patent.   Patented Dec. 23, 1913.

Application filed November 26, 1912. Serial No. 733,665.

*To all whom it may concern:*

Be it known that I, JOHN WALKER TILTON, a citizen of the United States, residing at Atlantic City, in the county of Atlantic and State of New Jersey, have invented certain new and useful Improvements in Curtain-Fasteners; and I do hereby declare the following to be a full, clear, and exact description of the invention, such as will enable others skilled in the art to which it appertains to make and use the same.

The invention relates to automobile or carriage-curtain fasteners, but it is equally adapted for use for many other purposes where a strong and serviceable fastening device may be required; and it consists generally of a stud member, adapted to be secured to the body of an automobile or carriage, or other device, provided with oppositely-disposed spring-acting latches adapted to confine or fasten a curtain or other object thereto, and a spring-restrained, slidable cap for operating said latches, so as to permit the unfastening or removal of the curtain or other object from the stud.

The invention also consists of the specific construction and arrangement of the several parts, as will be hereinafter fully described in this specification, and briefly stated in the claim.

The chief object of the invention is to produce a simple and durable fastener by means of which a curtain, provided with the usual eyelet or button-hole, may be easily and quickly fastened and unfastened.

Other objects of the invention will become apparent upon a complete disclosure thereof.

Figure 1:
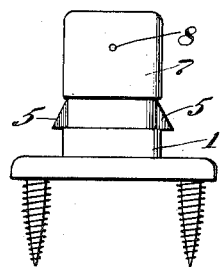
Figure 2:
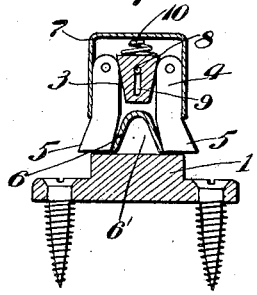
Figure 3:
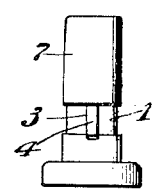
Figure 4:
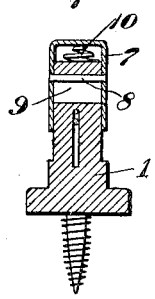
Figure 5:
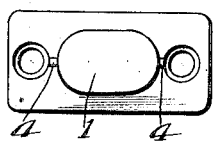
Figure 6:
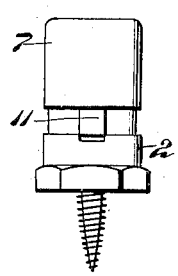
Figure 7:
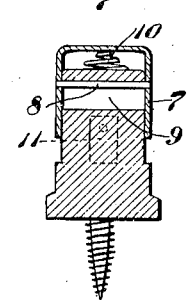
Figure 8:
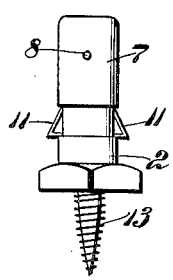
Figure 9:
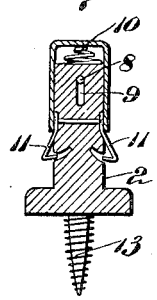
Figure 10:
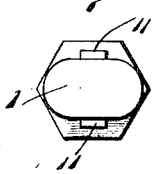

In the drawings—Figure 1 is a side elevation of my improved fastener; Fig. 2 a vertical, longitudinal section thereof; Fig. 3, an end elevation; Fig. 4, a vertical, transverse section; Fig. 5, a top plan view, and Figs. 6, 7, 8, 9, and 10 similar views, respectively of a modified form.

Referring to the several views, particularly to Figs. 1 to 5, inclusive, the numeral 1 indicates a flanged stud provided with screw-holes to adapt it to be fastened, by screws, to an object to which a curtain or an awning, provided with the usual eyelet, is to be fastened. The stud is provided with oppositely-disposed slots 3, 3, in which are pivoted latches 4 formed with upwardly inclined toes 5 held normally in an outwardly projecting position by a spring 6, an opening 6′ being cut transversely through the stud for its reception. Fitting over the upper portion of the stud is a vertically-slidable cap 7 for operating upon the spring-latches to cause the release of the curtain or other fastened articles. The cap is limited in its upward movement by a pin 8 which passes through said cap and a slot 9 in the upper portion of the stud, and a spring 10 is arranged between the upper end or top of the stud and the slidable cap to hold the cap in normally raised position, slightly above or out of contact with the toes of the spring-latches.

The flanged stud being secured to a body of an automobile or carriage, the operation of fastening the curtain is accomplished as follows: The eyelet of a curtain is passed over the cap and over the inclined portion of the toes, forcing the toes back into their slots against the action of the springs, until the curtain has been passed beyond the ends of the toes. As soon as this is accomplished the toes are forced outward by the action of the spring, and the curtain will be confined between the ends of the latches and the flange of the stud. To unfasten the curtain, the cap is pushed down, against the action of the spring 10, forcing the spring latches inward and permitting the curtain to be released.

In the form shown in Figs. 6 to 10 inclusive, the latches consist of leaf springs 11 fastened in any well-known manner in the upper end of the slots 3, and the flange of the stud is provided with a screw 13 integral therewith, to adapt the stud being secured to the body of the automobile or carriage. The operation of fastening and unfastening the curtain is the same as heretofore described.

It will be obvious that the flanged stud and cap may be of any suitable or preferred shape in cross-section, and it will be noted that the slot 9 is of such a length as will permit the cap to be moved down sufficiently far to free the toes of the spring-latches from their engagement with the curtain and permit it being unfastened.

Having thus fully described my invention, what I claim is:—

As an article of manufacture, a curtain-fastener, comprising a base plate adapted to be attached to a fixed object, said base-plate being provided with an integral stud having oppositely-disposed longitudinal slots, spring-pressed latches pivoted in said slots, a tubular cap slidable upon the stud and adapted to force said latches within their slots, a spring for holding said cap normally out of engagement with the latches and means consisting of a pin passing through a slot in the stud, for holding the cap in operative position and limiting its movement.

In testimony whereof I affix my signature, in the presence of two witnesses.

JOHN WALKER TILTON.

Witnesses:
CARLETON E. ADAMS,
HELENE M. STUTZBACH.